United States Patent
Pradhan et al.

(10) Patent No.: US 9,583,237 B2
(45) Date of Patent: Feb. 28, 2017

(54) METHOD OF MANUFACTURING A POLYMER-INSULATED CONDUCTOR

(71) Applicant: ABB Schweiz AG, Baden (CH)

(72) Inventors: Manoj Pradhan, Bålsta (SE); Thorsten Steinmetz, Baden-Dättwil (CH); Venkatesulu Bandapalle, Västerås (SE); Harald Martini, Västerås (SE); Adam Michalik, Bibice (PL); Artur Siwek, Krakow (PL); Bartlomiej Adamczyk, Niedzwiedz (PL); Jonas Ekeberg, Fislisbach (CH); Renata Porebska, Oswiecim (PL); Roberto Zannol, Montegrotto Terme (IT); Santanu Singha, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/025,257

(22) PCT Filed: Sep. 19, 2014

(86) PCT No.: PCT/EP2014/070010
§ 371 (c)(1),
(2) Date: Mar. 25, 2016

(87) PCT Pub. No.: WO2015/044049
PCT Pub. Date: Apr. 2, 2015

(65) Prior Publication Data
US 2016/0225493 A1    Aug. 4, 2016

(30) Foreign Application Priority Data
Sep. 26, 2013   (EP) .................................. 13186107

(51) Int. Cl.
| | | |
|---|---|---|
| H01B 13/00 | (2006.01) | |
| B05D 7/20 | (2006.01) | |
| H01B 13/14 | (2006.01) | |
| B29C 47/00 | (2006.01) | |

(Continued)

(52) U.S. Cl.
CPC .......... *H01B 13/145* (2013.01); *B05D 1/265* (2013.01); *B05D 7/20* (2013.01); *B29C 47/003* (2013.01);

(Continued)

(58) Field of Classification Search
CPC .. H01B 13/0016; H01B 13/14; H01B 13/145; B29C 47/0016; B29C 47/003;

(Continued)

(56) References Cited

U.S. PATENT DOCUMENTS

| | | | |
|---|---|---|---|
| 4,521,173 A | 6/1985 | Hilker et al. | |
| 5,151,147 A * | 9/1992 | Foster ................ | B29C 47/0016 156/244.12 |

(Continued)

FOREIGN PATENT DOCUMENTS

| | | |
|---|---|---|
| EP | 1496525 A2 | 1/2005 |
| GB | 943151 A | 11/1963 |

(Continued)

OTHER PUBLICATIONS

European Search Report Application No. 13 18 6107 Completed: Apr. 17, 2014 7 pages.

(Continued)

*Primary Examiner* — A. Dexter Tugbang
(74) *Attorney, Agent, or Firm* — Whitmyer IP Group LLC

(57) ABSTRACT

A method of manufacturing a polymer-insulated conductor. The method includes the steps of a) providing a conductor having a first cross-sectional shape, b) passing the conductor through a conductor-shaping die to shape the conductor such that the conductor obtains a second cross-sectional shape, wherein frictional heat is developed in the conductor, thereby setting the conductor in a heated state, c) applying molten polymer to the conductor when the conductor is in the heated state to obtain a polymer-coated conductor, and d)

(Continued)

shaping the polymer-coated conductor by means of a polymer-shaping die to thereby obtain the polymer-insulated conductor.

18 Claims, 2 Drawing Sheets

(51) Int. Cl.
    *B05D 1/26*     (2006.01)
    *B05D 1/42*     (2006.01)
    *B05D 3/02*     (2006.01)

(52) U.S. Cl.
    CPC ..... *B29C 47/0016* (2013.01); *H01B 13/0016* (2013.01); *H01B 13/14* (2013.01); *B05D 1/42* (2013.01); *B05D 3/0218* (2013.01); *Y10T 29/4998* (2015.01); *Y10T 29/49117* (2015.01); *Y10T 29/49204* (2015.01)

(58) Field of Classification Search
    CPC ......... Y10T 29/49117; Y10T 29/49204; Y10T 29/4998; B05D 7/20; B05D 3/0218; B05D 1/265; B05D 1/42
    See application file for complete search history.

(56) References Cited

U.S. PATENT DOCUMENTS

| | | |
|---|---|---|
| 2003/0017950 A1 | 1/2003 | Rey et al. |
| 2004/0016503 A1* | 1/2004 | Stowe ................ B29C 47/0016 156/244.12 |
| 2010/0203231 A1* | 8/2010 | Kusaka ................. H01B 13/14 427/9 |

FOREIGN PATENT DOCUMENTS

| | | |
|---|---|---|
| GB | 1575922 A | 10/1980 |
| JP | 04214328 A * | 8/1992 |
| WO | 2011091196 A1 | 7/2011 |

OTHER PUBLICATIONS

International Preliminary Report on Patentability Application No. PCT/EP2014/070010 Completed: Sep. 10, 2015 11 pages.
International Search Report and Written Opinion Application No. PCT/EP2014/070010 Completed: Nov. 12, 2014; Mailed: Nov. 26, 2014 11 pages.

* cited by examiner

METHOD OF MANUFACTURING A POLYMER-INSULATED CONDUCTOR

TECHNICAL FIELD

The present disclosure generally relates to electrical conductors and in particular to a method of manufacturing an electrically insulated electrical conductor.

BACKGROUND

Electrical conductors may for example be used in power transmission and distribution applications, and in power transformation. In these applications it is desirable to electrically insulate electrical conductors such that they do not short-circuit and thereby damage electrical equipment and/or cause injury to people.

GB 943 151 discloses an example of a method of insulating electric cables and conductors with an insulating plastic material. The conductor is drawn through a bath of molten plastic material and thereafter through a die. The die has a conical hole, and the cone angle is 6-12 degrees, and the smallest diameter of the conical hole is 20-30% larger than that of the uncoated conductor.

U.S. Pat. No. 4,521,173 discloses an apparatus for the manufacture of a coated filament such as a magnet wire. The method may comprise heating the filament, depending on the coating material utilized and the wire properties desired. In this case, the filament is heated by means of a heating device to a temperature of about decomposition temperature. In most applications the filament is heated to about the melting point of the coating material. The filament then travels through a die where the coating is applied.

For high voltage and medium voltage applications it is especially important that the electrical insulation provided around a conductor is reliable, as for example, the electrical insulation may progressively be destroyed due to repeated corona/partial discharges generated within the insulated electrical conductor.

The electrical insulation of many existing electrically insulated electrical conductors is hence prone to progressive destruction.

SUMMARY

In view of the above, an object of the present disclosure is to provide a method of manufacturing an insulated electrical conductor which may prolong the lifetime of the insulation and thus of the electrical conductor.

Hence, there is provided a method of manufacturing a polymer-insulated conductor, wherein the method comprises:
  a) providing a conductor having a first cross-sectional shape,
  b) passing the conductor through a conductor-shaping die to shape the conductor such that the conductor obtains a second cross-sectional shape, wherein frictional heat is developed in the conductor, thereby setting the conductor (P0) in a heated state,
  c) applying molten polymer to the conductor when the conductor is in the heated state to obtain a polymer-coated conductor, and
  d) shaping the polymer-coated conductor by means of a polymer-shaping die to thereby obtain the polymer-insulated conductor.

By applying the molten polymer to the conductor which is in a heated state, the polymer layer may better adhere to the conductor resulting in a reduced risk of delamination between the polymer layer and the conductor. The reduced risk of delamination implies a more electrically reliable insulation with a reduced risk of progressive destruction of the insulation due to corona/partial discharges.

Moreover, since the frictional heat developed in the conductor in the shaping process of step b) due to the progression through the conductor-shaping die is utilised in the application step c), it would not be necessary to heat the conductor by external means for application and shaping steps. Energy consumption of the production process may thereby be reduced.

Furthermore, the production becomes more cost efficient, since the shaping of the conductor and the shaping of the polymer-coated conductor are performed in the same process, and requires smaller space in the production line. Also, since conductor profiling and profiling of the polymer-coated conductor is performed together the polymer-insulated conductor will obtain a higher quality because oxidation and other contaminations of the profiled conductor may be avoided. By means of the present method the insulation layer of the polymer-insulated conductor may be essentially uniformly thick, and the polymer coating may efficiently and in a simple manner be performed along an entire conductor. In combination with the reduced risk of delamination, uniform dielectric properties of the polymer-insulated conductor may thus be obtained along its entire longitudinal extension.

The polymer-insulated conductor may advantageously be utilised as a winding conductor of an electromagnetic induction device such as a power transformer, reactor or a rotating electrical machine.

According to one embodiment the conductor-shaping die is adapted to shape the conductor rectangular with rounded corners. A conductor geometry with rounded corners reduces the electric field stress in the polymer-insulated conductor.

According to one embodiment the polymer-shaping die is adapted to shape the polymer-coated conductor to a rectangular cross section with rounded corners.

According to one embodiment the polymer-shaping die is adapted to shape the polymer-coated conductor to a rectangular cross section with corners which have radii smaller than the rounded corners of the conductor. By shaping the polymer-coated conductor in a manner in which the radii of the external corners, at any arbitrarily selected cross section of the polymer insulation layer, is smaller than that of the conductor which it insulates the dielectric properties of an entire insulation system which comprises such a polymer-insulated conductor may be improved. Such an insulation system may for example comprise spacers, a dielectric fluid, and the polymer-insulated conductor. This is especially the case if the polymer-insulated conductor is to be utilised as a winding, for example, where, wedges may form between adjacent winding turns and sticks and spacers due to the cross-sectional shape of the insulated winding. These wedges allow dielectric fluid, such as transformer oil or gas to gather therebetween. The mismatch of permittivity of fluid and solid materials results in higher electric field stress in the wedges compared to the case wedges would not have been present. By means of the shape according to the present embodiment, the size/volume of the wedges may at least be reduced if the polymer-insulated conductor is to be used as windings. Moreover, the manufacturing method presented herein provides a simple method of producing a polymer-insulated conductor which at any arbitrarily selected point has a cross-section which tends towards a rectangular shape with right angled corners.

According to one embodiment the corners of the polymer-insulated conductor are essentially right angled.

According to one embodiment a ratio of a radius of a corner of the conductor and the polymer-insulated conductor is in the range 1:0.9 to 1:0.1.

According to one embodiment the polymer-shaping die is an extrusion die.

According to one embodiment the molten polymer is one of a thermoplastic, a thermoplastic elastomer, a fluoroelastomer, and an epoxy thermoplastic blend.

According to one embodiment the centre of a die opening of the conductor-shaping die is aligned with a centre of a die opening of the polymer-shaping die.

According to one embodiment a cross-sectional shape of the die opening of the conductor-shaping die differs from a cross-sectional shape of the die opening of the polymer-shaping die.

According to one embodiment the cross-sectional dimensions of the die opening of the conductor-shaping die are smaller than the cross-sectional dimensions of the conductor.

According to one embodiment the polymer-insulated conductor is a high voltage conductor.

According to one embodiment the polymer-insulated conductor is a medium voltage conductor.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise. Moreover, any step in a method need not necessarily have to be carried out in the presented order, unless explicitly stated otherwise.

BRIEF DESCRIPTION OF THE DRAWINGS

The specific embodiments of the inventive concept will now be described, by way of example, with reference to the accompanying drawings, in which:

FIG. 1b schematically depicts a front view of a polymer-shaping die of the extrusion arrangement in FIG. 1a;

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1A:
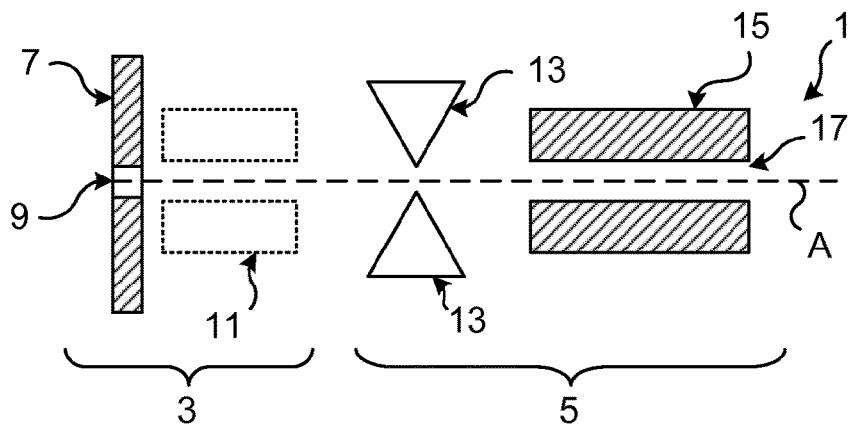
FIG. 1a schematically depicts a longitudinal section of an extrusion arrangement for the manufacturing of a polymer-insulated conductor.

FIG. 1a depicts a schematic longitudinal section of an extrusion arrangement 1 for the manufacturing of a polymer-insulated conductor. The extrusion arrangement 1 comprises a conductor shaping section 3 in which the cross-sectional shape of the conductor is formed. A conductor as defined herein is generally of metal, for example copper or aluminium or any other suitable material with good conductivity of electricity.

The extrusion arrangement 1 comprises a polymer shaping section 5 in which molten polymer is applied to a conductor which has been shaped or formed in the conductor shaping section 3. The polymer may for example be a thermoplastic such as Polythene (PE), polyethylene terephthalate, Polyetherimide (PEI), poly(p-phenylene sulphide), polyphenylsulfone, and polybutylene terephthalate, a thermoplastic elastomer, a fluoroelastomer, or an epoxy thermoplastic blend. After application of the molten polymer, the cross-sectional shape of the polymer-coated conductor is shaped or formed in the polymer shaping section 5. Especially, the polymer applied to the conductor is shaped in the polymer shaping section 5.

A conductor exiting the conductor shaping section 3 may continuously be fed into the polymer shaping section 5 to thereby form a continuous manufacturing process. The conductor shaping section 3 and the polymer shaping section 5 thus define a single process line.

Returning to FIG. 1a, the extrusion arrangement 1 will now be described in more detail. The extrusion arrangement 1 comprises a conductor-shaping die 7 which is arranged to shape a conductor which is passed through the conductor-shaping die 7. For this purpose, the conductor-shaping die 7 has a die opening 9 extending therethrough. The dimensions of the die opening 9 are smaller than the dimension of a conductor which is to be passed through the conductor-shaping die 7.

Optionally, the extrusion arrangement 1 may comprise a cooling unit 11 downstream of the conductor-shaping die 7 relative to a direction along which the conductor moves through the extrusion arrangement 1 when a polymer-insulated conductor is being manufactured. The cooling unit 11 has a through opening or channel, through which a conductor can pass. The cooling unit 11 is arranged to cool a conductor which has been shaped or formed by the conductor-shaping die 7, as a considerable amount of frictional heat develops in a conductor due to frictional forces when it is forced through the conductor-shaping die 7. The cooling unit 11 is arranged to cool a conductor in such a manner that it retains heat obtained when passing through the conductor-shaping die 7. The centre of the through opening of the cooling unit 11 is beneficially aligned with the centre of the die opening 9, along a common central axis A.

The extrusion arrangement 1 comprises a polymer application device 13. The polymer application device 13 is arranged downstream of the conductor shaping die 7. Embodiments of the extrusion arrangement which comprises the cooling unit 11, have the polymer application device arranged downstream of the cooling unit 11. The polymer application device 13 may comprise one or more hoppers which can be fed with polymer pellets or polymer powder. The polymer application device 13 is arranged to apply molten polymer, obtained from the polymer pellets or polymer powder, to a conductor.

The extrusion arrangement 1 comprises a polymer-shaping die 15 arranged to shape a polymer-coated conductor. The polymer-shaping die 15 is arranged downstream of the polymer application device 13. The polymer-shaping die 15 has a die opening 17 through which the polymer-coated conductor is able to pass. Beneficially, the centre of the die opening 17 is arranged along the central axis A, i.e. aligned with the centre of the die opening 9 of the conductor-shaping die 7.

Figure 1B:
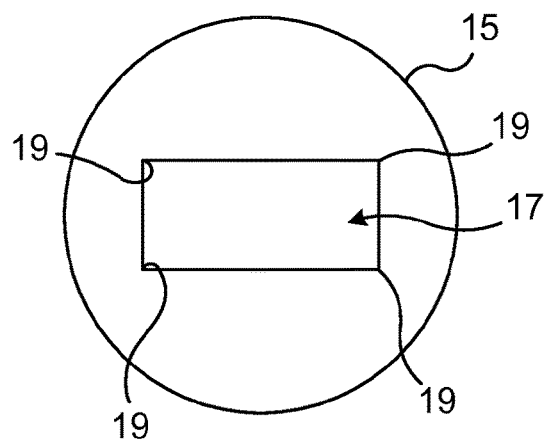

FIG. 1*b* depicts a front view of an example of polymer-shaping die 15. According to the depicted example, the cross section of the die opening 17 has a rectangular shape with essentially right angled corners 19. The cross-sectional shape of the die opening 17 of the polymer-shaping die 15 may according to one example of the extrusion arrangement 1 differ from the cross-sectional shape of the die opening 9 of the conductor-shaping die 7. By manufacturing polymer-insulated conductors which are essentially rectangular, i.e. with right angled or essentially right angled corners along their entire or essentially entire longitudinal extension, the electric withstand strength of an electrical system comprising such a polymer-insulated conductor may be increased, especially if the polymer-insulated conductor is to be used as windings. In particular, the size of wedges between the polymer-insulated conductor and sticks and spacers and/or adjacent turns of the polymer-insulated conductor may be reduced.

It should be noted that other cross-sectional shapes than the one described in the paragraph above are also envisaged. The cross-sectional shape of the die opening could for example be rectangular with rounded corners with the same or essentially the same radii as the corners of the conductor-shaping die. The cross-sectional shape of the die openings 9, 17 of the conductor-shaping die 7 and the polymer-shaping die 15 may, according to one example, thus be the same or essentially the same.

Figure 1C:
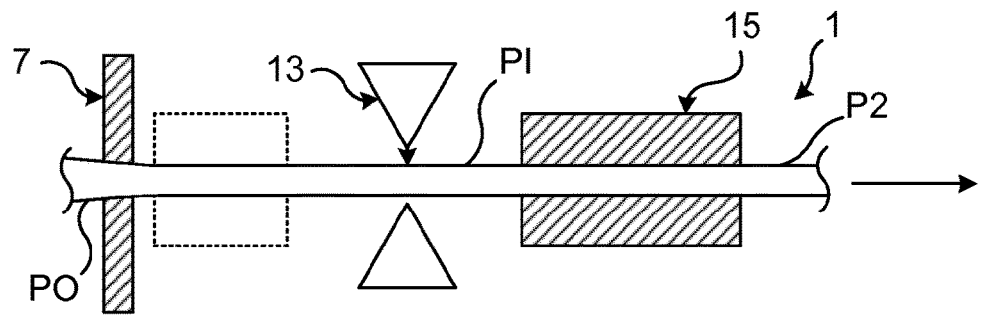
FIG. 1c schematically shows a longitudinal section of the extrusion arrangement in FIG. 1a during production of a polymer-insulated conductor.
Figure 2:
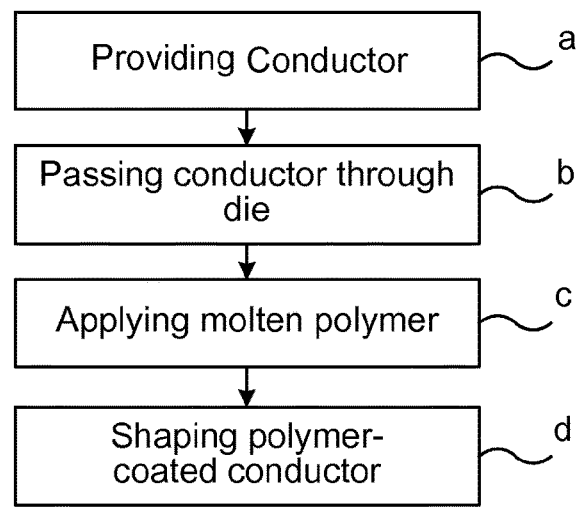
FIG. 2 depicts a flowchart of a method of manufacturing a polymer-insulated conductor.

The manufacturing method will now be described in more detail with reference to FIGS. 1*c* and 2. FIG. 1*c* depicts a longitudinal section of the extrusion arrangement in FIG. 1*a* during manufacturing of a polymer-insulated conductor P2. Prior to obtaining the finished product, i.e. the polymer-insulated conductor P2, a conductor P0 is processed in several stages.

In a step a), conductor P0 which has a first cross-sectional shape is provided. The conductor P0 may for example be provided by uncoiling it from a drum.

In a step b) the conductor P0 is passed through the conductor-shaping die 7. The dimensions of the die opening 9 of the conductor-shaping die 7 are smaller than that of the conductor P0. The conductor P0 may for example be pulled through the conductor-shaping die 7. Due to the differing dimensions of the conductor P0 and the die opening 9 of the conductor-shaping die 7, the frictional forces exerted on the conductor P0 as it passes through the die opening 9 are converted into heat in the conductor P0. Heat is hence developed in the conductor P0 during step b).

As the conductor P0 passes through the conductor-shaping die 7 the conductor P0 obtains a second cross-sectional shape. At least one cross-sectional dimension of the conductor P0 is smaller than prior to the passage through the conductor-shaping die 7. The second cross-sectional shape may be identical to that of the first cross-sectional shape, or it may differ from the first cross-sectional shape.

In embodiments which comprise the cooling unit 11, the conductor P0 proceeds through the cooling unit 11 to reduce the temperature obtained in step a) in which the conductor P0 passes through the conductor-shaping die 7. The temperature of the conductor P0 is not cooled to a steady state temperature, i.e. the conductor P0 still maintains heat obtained in step b) of passing the conductor P0 through the conductor-shaping die 7.

According to one variation which comprises the cooling unit, the heat absorbed from the conductor P0 by the cooling unit may be utilised by the polymer application device for melting polymer pellets or polymer powder. This may be realised by means of a heat exchanging device which transports heat from the conductor to the polymer application device.

In a step c) molten polymer is applied to the conductor P0 while the conductor P0 is in the heated state resulting from step b). It should here be noted that even if the conductor has been cooled by a cooling unit, as in some examples presented herein, some heat is maintained from that obtained in step b). The molten polymer is applied to the conductor P0 by the polymer application device 13. Thus, a polymer-coated conductor P1 is obtained.

In a step d) the polymer-coated conductor P1 is shaped by means of the polymer-shaping die 15. A polymer-insulated conductor P2 is thereby obtained.

The molten polymer applied to the conductor P0 in step c) at each instance may for example be of such amount that the polymer-insulated conductor P2 obtains an insulation layer in the range 0.025-0.5 mm, preferably in the range 0.025-0.2 mm.

Beneficially, steps a)-d) are performed in a continuous manner with the conductor P0 moving continuously through the extrusion arrangement 1 along the central axis A during production. The movement of the conductor, in each state of the process, may preferably be rectilinear.

After step d) the polymer-insulated conductor P2 may, for example, be coiled onto a drum as the polymer-insulated conductor P2 exits the polymer-shaping die 15.

The manufacturing process may according to one variation comprise applying several insulation layers to the conductor in a similar manner as described in step c). These coating layers could thus be applied in a serial manner. The different layers may according to one variation thereof have differing dielectric constants.

Figures 3A, 3B:
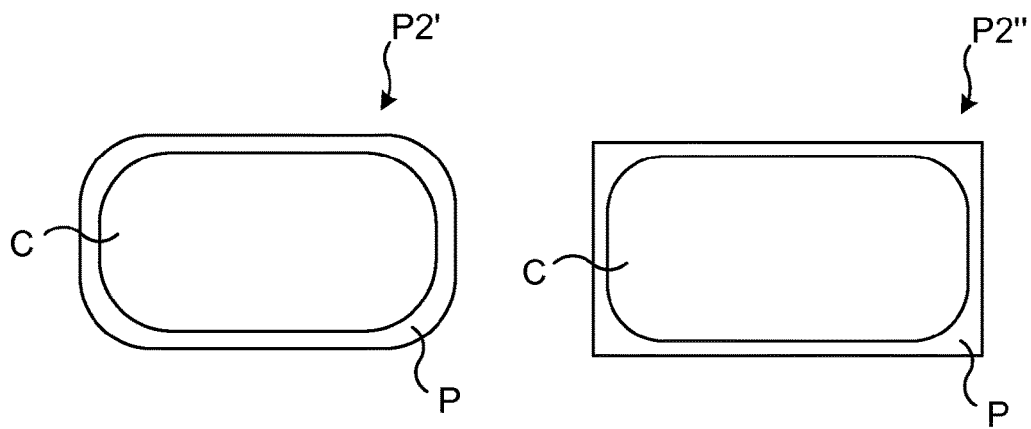
FIGS. 3a-b depict cross-sections of examples of a polymer-insulated conductor manufactured according to the method in FIG. 2.

FIGS. 3*a* and 3*b* depict cross sections of examples of polymer-insulated conductors P2. In FIG. 3*a* polymer-insulated conductor P2' has a conductor C which has been shaped by the conductor-shaping die, and which has an oblong rectangular cross-sectional shape with rounded corners. An insulating polymer layer P applied in step c) and shaped in step d) provides an essentially identical cross-sectional shape to the polymer-insulated conductor P2' as the conductor C, i.e. the cross-sectional shape is oblong rectangular with rounded corners.

In FIG. 3*b*, a polymer-insulated conductor P2" is depicted. The polymer-insulated conductor P2" which has been shaped by the conductor-shaping die has an oblong rectangular shape cross-sectional shape with rounder corners. An insulating polymer layer P applied in step c) and shaped in step d) provides a different cross-sectional shape to the polymer-insulated conductor P'" than the cross-sectional shape of the conductor C. In particular, the external corners of the cross section of polymer-insulated conductor P2" are essentially right angled or orthogonal. The radii of the external corners are thus smaller than the radii of the corresponding corners of the conductor C. The ratio between the conductor radius and the polymer insulation radius may for example be in the range 1:0.9 to 1:0.05.

The present disclosure enables a simple method of producing a polymer-insulated conductor which provides a reduced risk of delamination of the polymer layer from the conductor. Moreover, it enables industrial scale production of a polymer-insulated conductor which has an external cross-section that differs from that of the insulated conductor. As described herein, the differing cross-sectional geometries of the conductor and the insulation provide increased dielectric withstand strength, especially if the polymer-insulated conductor is to be used as a winding of an electromagnetic induction device such as a power transformer, small power transformer or a reactor. The polymer-insulated conductor may, when used in an electromagnetic induction device, beneficially be utilised with a plurality of different dielectric fluids including liquid dielectric fluids such as transformer oils, and gas dielectric fluids such as SF6 or an dielectric insulation gas comprising an organo-fluorine compound such as a fluoroether, an oxirane, a fluoroamine, a fluoroketone, a fluoroolefine, and mixtures thereof. The polymer-insulated conductor may beneficially be utilised in high voltage or medium voltage applications, for example in power transmission or power distribution networks.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of manufacturing a polymer-insulated conductor, wherein the method comprises:
   a) providing a conductor having a first cross-sectional shape,
   b) passing the conductor through a conductor-shaping die to shape the conductor such that the conductor obtains a second cross-sectional shape, wherein frictional heat is developed in the conductor, thereby setting the conductor in a heated state,
   c) applying molten polymer to the conductor when the conductor is in the heated state to obtain a polymer-coated conductor, and
   d) shaping the polymer-coated conductor by passing the polymer-coated conductor through a polymer-shaping die to thereby obtain the polymer-insulated conductor.

2. The method as claimed in claim 1, wherein the conductor-shaping die is adapted to shape the conductor to a rectangular cross section with rounded corners.

3. The method as claimed in claim 2, wherein the polymer-shaping die is adapted to shape the polymer of the polymer-coated conductor to a rectangular cross section with rounded corners that have radii smaller than radii of the rounded corners of the conductor.

4. The method as claimed in claim 3, wherein corners of the polymer-insulated conductor are essentially right angled.

5. The method as claimed in claim 3, wherein a ratio of a radius of a corner of the conductor and a radius of a corner of the polymer-insulated conductor is in the range 1:0.9 to 1:0.1.

6. The method as claimed in claim 2, wherein the polymer-shaping die is adapted to shape the polymer-coated conductor to a rectangular cross section with rounded corners.

7. The method as claimed in claim 1, wherein the polymer-shaping die is adapted to shape the polymer-coated conductor to a rectangular cross section with rounded corners.

8. The method as claimed in claim 1, wherein the polymer-shaping die is an extrusion die.

9. The method as claimed in claim 1, wherein the molten polymer is one of a thermoplastic, a thermoplastic elastomer, a fluoroelastomer, and an epoxy thermoplastic blend.

10. The method as claimed in claim 1, wherein the conductor-shaping die has a die opening with a first center and the polymer-shaping die has a die opening with a second center, wherein the first center is aligned with the second center.

11. The method as claimed in claim 10, wherein a cross-sectional shape of the die opening of the conductor-shaping die differs from a cross-sectional shape of the die opening of the polymer-shaping die.

12. The method as claimed in claim 10, wherein cross-sectional dimensions of the die opening of the conductor-shaping die are smaller than cross-sectional dimensions of the conductor.

13. The method as claimed in claim 1, wherein the polymer-insulated conductor is a high voltage conductor.

14. The method as claimed in claim 1, wherein the polymer-insulated conductor is a medium voltage conductor.

15. The method as claimed in claim 1, further comprising cooling the conductor with a cooling unit after the conductor passes through the conductor-shaping die but before applying the molten polymer to the conductor.

16. The method as claimed in claim 15, wherein the cooling unit cools the conductor without the conductor reaching a steady state temperature.

17. The method as claimed in claim 1, using the frictional heat resulting from passing the conductor through the conductor-shaping die to melt polymer pellets or polymer powder into the molten polymer that is to be applied to the conductor.

18. The method as claimed in claim 17, further comprising using a heat exchanging device to transport the frictional heat from the conductor to a polymer application device which melts the polymer pellets or the polymer powder and applies the molten polymer to the conductor.

* * * * *